(No Model.)

E. H. ASHCROFT.
APPARATUS FOR AGING LIQUORS.

No. 302,882. Patented Aug. 5, 1884.

WITNESSES.
Fred. Harris
Fred. B. Dolan.

INVENTOR.
Edward H. Ashcroft
by his attys
Clarke & Raymond.

UNITED STATES PATENT OFFICE.

EDWARD H. ASHCROFT, OF LYNN, MASSACHUSETTS.

APPARATUS FOR AGING LIQUORS.

SPECIFICATION forming part of Letters Patent No. 302,882, dated August 5, 1884.

Application filed September 3, 1883. (No model.)

*To all whom it may concern:*

Be it known that I, EDWARD H. ASHCROFT, of Lynn, in the county of Essex and State of Massachusetts, a citizen of the United States, have invented a certain new and useful Apparatus for Aging Liquors, of which the following is a full, clear, and exact description, reference being had to the accompanying drawings, forming a part of this specification, in explaining its nature, in which—

Figure 1:
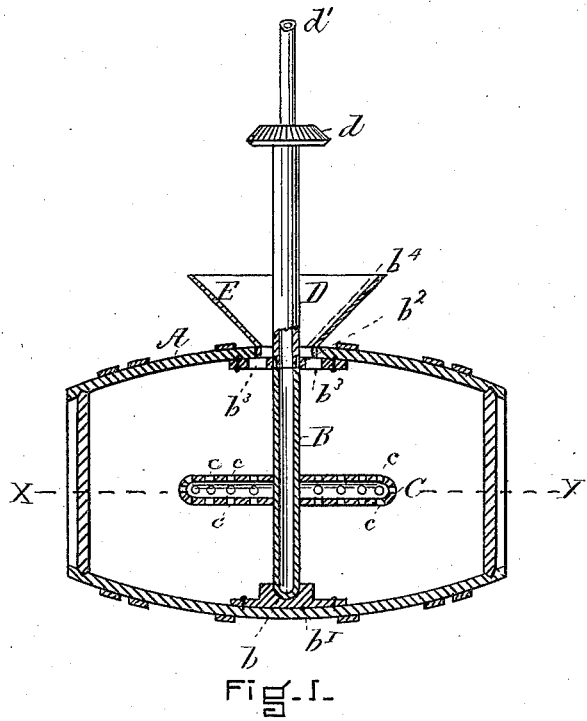
Figure 2:
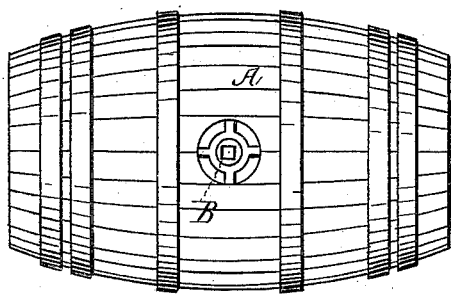
Figure 3:
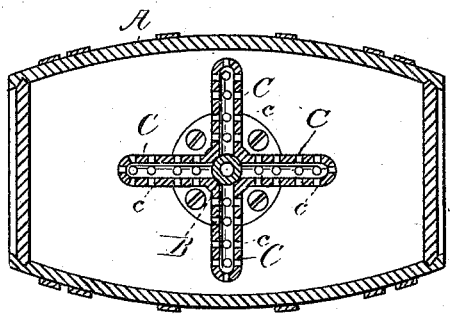

Figure 1 represents a barrel containing my improvement. Fig. 2 is a plan view thereof. Fig. 3 is a horizontal section upon the line $x$ $x$ of Fig. 1.

Heretofore air has been introduced into liquors for the purpose of aging them; and I do not, therefore, broadly claim the mere introduction of air into the receptacle holding the liquor; and my invention consists not only in a peculiar manner of introducing air for aerating the liquor, but also in an agitating device which shall agitate the liquor, while at the same time it distributes the air uniformly as it agitates.

I have represented the invention as applied to a barrel, but it can be applied also to any other receptacle of any suitable shape.

In the drawings, A is the barrel; B, the hollow shaft, having a bearing, $b$, in the step $b'$, fastened to the barrel, and an upper bearing in the support $b^2$, which is also fastened to the barrel, and has the holes $b^3$, which communicate with the bung-hole $b^4$.

Extending radially from the shaft B are the hollow perforated arms C, which open into the hollow shaft B. These arms are shown in the drawings as circular, and as substantially centrally arranged in the barrel; but of course they may be of any desirable shape and any number of them may be used, and the shaft, instead of extending across the barrel, as represented in Fig. 1, may extend from the head downwardly, if desired. The lower bearing-piece, $b'$, should be secured in place in making the barrel; but the other parts can be made so as to be put in place within the barrel after the barrel is made, if desired.

The agitating device is revolved by means of the hollow shaft D. It may be revolved in any suitable way, and I have represented as one means a bevel-gear, $d$, which meshes with a driven bevel-gear. (Not shown.)

The pipe $d'$ connects the hollow pipe D with a bank or reservoir of compressed air, which may be heated or not, as desired; and I prefer that the air be under a pressure of, say, four or five atmospheres, in order to bring in contact with the liquor as much air as possible within a short period of time, as the quickness of the aging process seems to depend upon the amount of air that can be brought in contact with its particles.

The air escapes from the barrel or other receptacle or tank through any suitable aperture, and when a barrel is used it may be desirable to secure to the bung the tunnel-shaped vessel or other equivalent device, E, tightly fitted to the bung, in which the foam caused by the agitation and aeration can enter, so that the contents of the barrel shall not be wasted; and, if desired, this vessel E may be tightly closed at the top of a pipe to convey the gas which shall be liberated therefrom to any suitable chamber for saving it and condensing it.

In operation the air is either at atmospheric temperature or heated, and is forced through the supply-pipe $d'$ into the hollow shaft B, and distributed in the liquor through the apertures $c$ in the agitating-arms C as the shaft is revolved, and is thereby well distributed to all parts of the liquor and while it is in agitation.

Of course the extent of agitation is determined by the shape of the arms and the rapidity of their revolution, and I do not confine myself to the degree of speed at which the agitator may be revolved. In some instances the device may be revolved so slowly as not to agitate the liquor to any material extent, in which case it acts as a simple air-distributer.

Having thus fully described my invention, I claim and desire to secure by Letters Patent of the United States—

1. In a device for giving age to liquors, the combination of the barrel A, the hollow shaft B, the upper-bearing piece $b^2$, having the openings $b^3$, and arranged in relation to the bung-hole $b^4$ of the barrel, as described, the lower-bearing piece $b^2$, the perforated hollow arms C, the hollow shaft D, and the supply-pipe $d'$, all substantially as and for the purposes described.

2. In a device for giving age to liquors, the combination of the upper-bearing piece $b^2$, having perforations or openings $b^3$, arranged in relation to the bung-hole $b^4$ of a barrel, all substantially as and for the purposes described.

EDWARD H. ASHCROFT.

Witnesses:
F. F. RAYMOND, 2d,
FRED. HARRIS.